J. M. UNDERWOOD.
Whip Socket.

No. 231,510.   Patented Aug. 24, 1880.

Witnesses:
Henry Eichling
A. S. Fitch

Inventor:
John M. Underwood
By J. P. Fitch
His Atty.

United States Patent Office.

JOHN M. UNDERWOOD, OF NEWARK, N. J., ASSIGNOR TO ANSON SEARLS.

WHIP-SOCKET.

SPECIFICATION forming part of Letters Patent No. 231,510, dated August 24, 1880.

Application filed January 19, 1880.

*To all whom it may concern:*

Be it known that I, JOHN M. UNDERWOOD, of Newark, State of New Jersey, have invented a new and useful Improvement in Whip-Sockets, of which the following is a specification, reference being had to the accompanying drawings, forming part of the same, of which—

Figure 1:
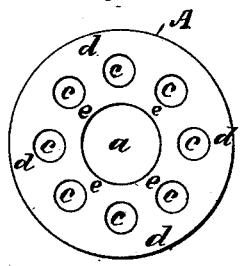
Figure 2:
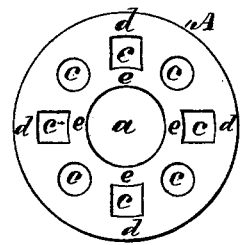
Figure 3:
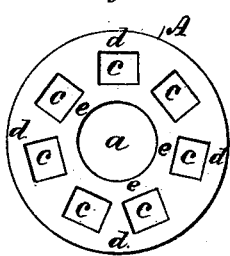
Figure 4:
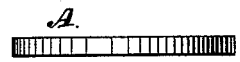
Figure 5:
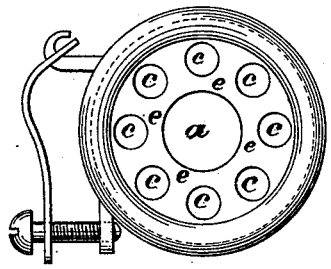

Figure 1 is a face view of a rubber ring containing my improvement. Figs. 2 and 3 are modifications of the same. Fig. 4 is an edge view of said ring, and Fig. 5 is a top end view of a whip-socket provided with the said ring or disk.

My invention relates to the flexible elastic ring used in the upper end of whip-sockets for holding the whip-stock upright in the socket.

A flexible elastic ring or disk, placed in an annular recess just within the upper open end of whip-sockets, for the purpose of preventing the whip-stock from wabbling in the socket and from being rubbed or chafed against the body of the socket, is a common device; but a difficulty has been experienced in retaining this elastic ring in place in the socket and the ring yet be adapted to receive and hold whip-stocks of various sizes. When the ring is made thick enough to adequately serve its purpose of holding the whip-stock and the central opening is of suitable size to hold the stocks of small diameter, the ring is liable to be pushed or pulled out of its groove or seat in the socket by the insertion of a stock of larger diameter. To obviate this difficulty I form a plane ring or perforated disk of rubber, or its equivalent, of suitable external diameter to fit into the common annular groove in the mouth of the socket, and of sufficient thickness for the purpose, preferably about an eighth of an inch, the central perforation or opening being of suitable size to grasp and fit around a whip-stock, preferably about one-half inch; then I cut away a portion of the rubber between the central opening and the outer edge or periphery, making a number of perforations of smaller size than the central opening. There should be left between these smaller openings and the said periphery sufficient breadth of rubber to substantially fill the groove in the socket, and also some portion of the rubber between these openings and the central opening, so that the whip-stock will be grasped by a continuous ring of rubber of the full thickness of the body of the disk, and a continuous and unbroken outer ring of said rubber will occupy the groove in the socket, while between the said outer and inner unbroken portions the rubber, by having portions cut away, will be so yielding and flexible that, practically, whip-stocks of varying sizes may be readily introduced into or withdrawn from the ring without liability to displace the ring from its seat in the socket.

In the drawings, A represents the disk, *a* the central opening, and *c* the openings where the rubber is cut away between the outer unbroken portion, *d*, and the inner unbroken portion, *e*, of the body of the disk.

B represents the upper end of a whip-stock with the said disk in place in an annular groove in said socket.

The openings *c* may be circular, as shown in Figs. 1 and 2, the form shown in Fig. 3, or any other suitable form, as preferred.

United States Letters Patent No. 221,482 were granted to me November 11, 1879, for improvement in whip-sockets, in which is described and claimed a rubber ring having non-contiguous projections on its inner edge. I regard my present invention as an improvement upon the invention covered by that patent, my present ring having, in fact, the said non-contiguous projections united together at their inner ends by an elastic ring.

What I claim as new, and desire to secure by Letters Patent, is—

The perforated flexible elastic disk A, adapted for use in a whip-socket, and composed of the outer unbroken ring, *d*, and the inner unbroken ring, *e*, with portions of the body of the disk cut away by openings *c* between the said outer and inner rings, as and for the purpose described.

JOHN M. UNDERWOOD.

Witnesses:
R. GRAY, Jr.,
L. K. GRAY.